United States Patent
Kume et al.

(10) Patent No.: US 7,728,937 B2
(45) Date of Patent: Jun. 1, 2010

(54) MULTI-DOMAIN LIQUID CRYSTAL WITH AXISYMMETRIC ALIGNMENT AND ELECTRODE HAVING ASYMMETRICAL CUTS AT THE EDGE

(75) Inventors: Yasuhiro Kume, Kawachinagano (JP); Noriaki Onishi, Nara (JP); Kazuhiko Tamai, Nabari (JP); Hiroaki Kojima, Kashiba (JP); Nobukazu Nagae, Suwa (JP)

(73) Assignee: Sharp Kabushiki Kaisha, Osaka (JP)

( * ) Notice: Subject to any disclaimer, the term of this patent is extended or adjusted under 35 U.S.C. 154(b) by 485 days.

(21) Appl. No.: 11/153,920

(22) Filed: Jun. 16, 2005

(65) Prior Publication Data
US 2005/0280754 A1    Dec. 22, 2005

(30) Foreign Application Priority Data
Jun. 17, 2004    (JP) ............................. 2004-179889

(51) Int. Cl.
G02F 1/1335    (2006.01)
G02F 1/1337    (2006.01)
G02F 1/1339    (2006.01)

(52) U.S. Cl. .................. 349/129; 349/114; 349/155; 349/156

(58) Field of Classification Search ......... 349/106–111, 349/114, 155–157, 129
See application file for complete search history.

(56) References Cited

U.S. PATENT DOCUMENTS

| | | | |
|---|---|---|---|
| 5,408,345 A | 4/1995 | Mitsui et al. | |
| 5,666,179 A | 9/1997 | Koma | |
| 6,195,140 B1 | 2/2001 | Kubo et al. | |
| 6,384,889 B1 | 5/2002 | Miyachi et al. | |
| 6,424,396 B1 * | 7/2002 | Kim et al. | 349/130 |

(Continued)

FOREIGN PATENT DOCUMENTS

JP    9-090426    4/1997

(Continued)

OTHER PUBLICATIONS

Co-pending U.S. Appl. No. 10/952,480, filed Sep. 29, 2004.

(Continued)

*Primary Examiner*—David Nelms
*Assistant Examiner*—Jessica M Merlin
(74) *Attorney, Agent, or Firm*—Nixon & Vanderhye PC

(57) ABSTRACT

The liquid crystal display device includes a first substrate, a second substrate opposed to the first substrate, and a vertically aligned liquid crystal layer interposed between the first and second substrates, and has a plurality of pixels each including a first electrode formed on the first substrate, a second electrode formed on the second substrate, and the liquid crystal layer interposed between the first and second electrodes. The first substrate has a shading region in gaps between the plurality of pixels, and a wall structure is placed regularly on the surface of the first substrate facing the liquid crystal layer in the shading region. A color filter layer of the second substrate has at least one hole formed at a predetermined position in each pixel. At least one liquid crystal domain having axisymmetric alignment is formed in the liquid crystal layer when at least a predetermined voltage is applied across the liquid crystal layer, and the center axis of the axisymmetrically aligned liquid crystal domain is formed in or near the hole in the color filter layer.

14 Claims, 7 Drawing Sheets

U.S. PATENT DOCUMENTS

| | | |
|---|---|---|
| 6,445,438 B1 | 9/2002 | Horie et al. |
| 6,452,654 B2 | 9/2002 | Kubo et al. |
| 6,466,296 B1 | 10/2002 | Yamada et al. |
| 6,654,090 B1 * | 11/2003 | Kim et al. .................. 349/129 |
| 6,661,488 B1 | 12/2003 | Takeda et al. |
| 6,724,452 B1 * | 4/2004 | Takeda et al. ............... 349/139 |
| 6,753,939 B2 | 6/2004 | Jisaki et al. |
| 6,788,375 B2 * | 9/2004 | Ogishima et al. ........... 349/130 |
| 6,900,869 B1 * | 5/2005 | Lee et al. .................... 349/129 |
| 2001/0024257 A1 | 9/2001 | Kubo et al. |
| 2002/0080320 A1 | 6/2002 | Suzuki et al. |
| 2003/0063244 A1 * | 4/2003 | Fujimori et al. ............. 349/113 |
| 2003/0202146 A1 * | 10/2003 | Takeda et al. ............... 349/129 |
| 2005/0068482 A1 | 3/2005 | Kume et al. |
| 2005/0213002 A1 * | 9/2005 | Wen et al. ................... 349/114 |

FOREIGN PATENT DOCUMENTS

| | | |
|---|---|---|
| JP | 2001-125144 | 5/2001 |
| JP | 2001-337332 | 12/2001 |
| JP | 2002-174814 A | 6/2002 |
| JP | 2003-315802 A | 11/2003 |
| JP | 2003-315803 | 11/2003 |

OTHER PUBLICATIONS

Co-pending U.S. Appl. No. 10/980,867, filed Nov. 4, 2004.
Co-pending U.S. Appl. No. 11/005,322, filed Dec. 7, 2004.
Co-pending U.S. Appl. No. 11/019,635, filed Dec. 23, 2004.
Co-pending U.S. Appl. No. 11/061,601, filed Feb. 22, 2005.
Co-pending U.S. Appl. No. 11/073,945, filed Mar. 8, 2005.

* cited by examiner

Transmission Region A | Reflection Region B

Transmission Region A | Reflection Region B

Liquid Crystal Domain

MULTI-DOMAIN LIQUID CRYSTAL WITH AXISYMMETRIC ALIGNMENT AND ELECTRODE HAVING ASYMMETRICAL CUTS AT THE EDGE

This application a U.S. patent application and claims priority to JP 2004-179889, filed 17 Jun. 2004, the entire content of which is hereby incorporated by reference.

BACKGROUND OF THE INVENTION

1. Field of the Invention

The present invention relates to a liquid crystal display device and a fabrication method for the same, and more particularly, to a liquid crystal display device suitably used for portable information terminals (for example, PDAs), mobile phones, car-mounted liquid crystal displays, digital cameras, PCs, amusement equipment, TVs and the like.

2. Description of the Related Art

The information infrastructure is advancing day to day, and equipment such as mobile phones, PDAs, digital cameras, video cameras and car navigators has penetrated deeply into people's lives. Liquid crystal display (LCD) devices have been adopted in most of such equipment. With increase of the information amount handled with the main bodies of the equipment, LCD devices are requested to display a larger amount of information, and are demanded by the market for higher contrast, a wider viewing angle, higher brightness, multiple colors and higher definition.

A vertical alignment mode using a vertically aligned liquid crystal layer has increasingly received attention as a display mode enabling high contrast and a wide viewing angle. The vertically aligned liquid crystal layer is generally obtained using a vertical alignment film and a liquid crystal material having negative dielectric anisotropy.

For example, Japanese Laid-Open Patent Publication No. 6-301036 (Literature 1) discloses an LCD device in which an inclined electric field is generated around an opening formed in a counter electrode that faces a pixel electrode via a liquid crystal layer, so that liquid crystal molecules surrounding liquid crystal molecules existing in the opening, which are in the vertically aligned state, are aligned in inclined directions around the opening as the center, to thereby improve the visual angle characteristics.

However, in the device described in Literature 1, it is difficult to generate an inclined electric field over the entire region of each pixel. Therefore, each pixel has a region in which liquid crystal molecules delay in response to a voltage, and this causes a problem of occurrence of an afterimage phenomenon.

Japanese Laid-Open Patent Publication No. 2002-55347 (Literature 2) discloses a technology in which slit electrodes (an opening pattern) are provided in both pixel electrodes and a counter common electrode and, in at least either the pixel electrodes or the common electrode, steps are provided in regions having the slit electrodes to distribute an inclined electric field in four directions uniformly using the opening pattern, to thereby achieve a wide viewing angle.

Japanese Laid-Open Patent Publication No. 2003-167253 (Literature 3) discloses a technology in which a plurality of projections are provided regularly in each pixel to stabilize the aligned state of liquid crystal domains having radially inclined alignment formed around the projections. This literature also discloses using an inclined electric field generated at openings formed in an electrode, together with the alignment regulating force of the projections, to regulate the alignment of liquid crystal molecules, and thus improve the display characteristics.

In recent years, a type of LCD device providing high-quality display both outdoors and indoors has been proposed (see Japanese Patent Gazette No. 2955277 (Literature 4) and U.S. Pat. No. 6,195,140 (Literature 5), for example). In this type of LCD device, called a transflective LCD device, each pixel has a reflection region in which display is done in the reflection mode and a transmission region in which display is done in the transmission mode.

The currently available transflective LCD devices adopt an ECB mode, a TN mode and the like. Literature 3 described above discloses adoption of the vertical alignment mode for, not only a transmissive LCD device, but also a transflective LCD device. Japanese Laid-Open Patent Publication No. 2002-350853 (Literature 6) discloses a technology in which in a transflective LCD device having a vertically aligned liquid crystal layer, the alignment (multi-axis alignment) of liquid crystal molecules is controlled with depressions formed on an insulating layer. The insulating layer is provided to make the thickness of the liquid crystal layer in a transmission region twice as large as that in a reflection region. According to this literature, the depressions are in the shape of a regular octagon, for example, and projections or slits (electrode openings) are formed at positions opposed to the depressions via the liquid crystal layer (see FIGS. 4 and 16 of Literature 6, for example).

The technology disclosed in Literature 3 has the following problems. Projections are provided in each pixel to form a plurality of liquid crystal domains in the pixel (that is, divide the pixel into domains), to thereby strengthen the alignment regulating force on liquid crystal molecules. According to examinations conducted by the inventors of the present invention, however, to obtain sufficient alignment regulating force, it is necessary to form an alignment control structure made of projections regularly placed inside each pixel, and this complicates the fabrication process. The contrast ratio may decrease due to light leakage occurring in the peripheries of the projections in the pixel. If a light-shading portion is provided to prevent decrease in contrast ratio, the effective aperture ratio may possibly decrease.

In the technology disclosed in Literature 6, it is necessary to provide projections or electrode openings at positions opposed to the depressions formed for control of the multi-axis alignment. This technology therefore has the same problems as those described above.

In view of the above, an object of the present invention is providing a liquid crystal display device having at least one axisymmetrically aligned domain in each pixel, in which the alignment of liquid crystal molecules is sufficiently fixed/stabilized with a comparatively simple construction.

SUMMARY OF THE INVENTION

The liquid crystal display device of the present invention includes a first substrate, a second substrate opposed to the first substrate, and a vertically aligned liquid crystal layer interposed between the first substrate and the second substrate, wherein the liquid crystal display device has a plurality of pixels, each pixel including a first electrode formed on the first substrate, a second electrode formed on the second substrate, and the liquid crystal layer interposed between the first electrode and the second electrode, the first substrate has a shading region in gaps between the plurality of pixels, and a wall structure is placed regularly on the surface of the first substrate facing the liquid crystal layer in the shading region, the second substrate has a color filter layer on the surface of the second electrode farther from the liquid crystal layer, the color filter layer having at least one hole formed at a predetermined position in each pixel, and at least one liquid crystal domain having axisymmetric alignment is formed in the liquid crystal layer when at least a predetermined voltage is applied across the liquid crystal layer, and the center axis of the axisymmetric alignment of the at least one liquid crystal domain is formed in or near the at least one hole.

In an embodiment, the at least one hole has a stepped or inclined side face.

In another embodiment, the first electrode has at least one first opening formed at a predetermined position in the pixel, and one end of the center axis of the axisymmetric alignment of the at least one liquid crystal domain is located in or near the at least one first opening, while the other end is located in or near the at least one hole.

In yet another embodiment, the at least one first opening and the at least one hole in the color filter layer are placed to at least overlap each other via the liquid crystal layer.

In yet another embodiment, the first electrode has at least one cut.

In yet another embodiment, the second electrode has at least one second opening formed at a position corresponding to the at least one hole in the color filter layer.

In yet another embodiment, a support for defining the thickness of the liquid crystal layer is placed in the shading region located in gaps between the plurality of pixels.

In yet another embodiment, the first electrode includes a transparent electrode defining a transmission region and a reflective electrode defining a reflection region, and the thickness dt of the liquid crystal layer in the transmission region and the thickness dr of the liquid crystal layer in the reflection region satisfy the relationship 0.3 dt<dr<0.7 dt.

In yet another embodiment, the first electrode includes a transparent electrode defining a transmission region and a reflective electrode defining a reflection region, the at least one liquid crystal domain includes a liquid crystal domain formed in the transmission region, the at least one hole includes a hole corresponding to the center axis of the liquid crystal domain formed in the transmission region, and the first electrode has a plurality of cuts formed point-symmetrically with respect to the hole.

In yet another embodiment, a transparent dielectric layer is selectively formed on the second substrate in the reflection region.

In yet another embodiment, the transparent dielectric layer has a function of scattering light.

In yet another embodiment, the optical density of the color filter layer in the reflection region is lower than that in the transmission region.

In yet another embodiment, the liquid crystal display device further includes: a pair of polarizing plates placed to face each other via the first substrate and the second substrate; and at least one biaxial optical anisotropic medium layer placed between the first substrate and one of the pair of polarizing plates and/or between the second substrate and the other polarizing plate.

In yet another embodiment, the liquid crystal display device further includes: a pair of polarizing plates placed to face each other via the first substrate and the second substrate; and at least one uniaxial optical anisotropic medium layer placed between the first substrate and one of the pair of polarizing plates and/or between the second substrate and the other polarizing plate.

The fabrication method for a liquid crystal display device of the present invention is a fabrication method for any of the liquid crystal display devices described above, including the step of forming the color filter layer, wherein the step of forming the color filter layer includes the steps of: forming a negative photosensitive resin film on the second substrate; exposing the negative photosensitive resin film to light so that at least one region smaller in exposure amount than the other region is formed at a predetermined position of the negative photosensitive resin film in each pixel; and developing the exposed photosensitive resin film to form the at least one hole at the predetermined position.

In one embodiment, the step of exposing the negative photosensitive resin comprises the step of forming a region in which the exposure amount changes stepwise or changes continuously, and the at least one hole having a stepped or inclined side face is formed by developing the negative photosensitive resin layer.

In the liquid crystal display device of the present invention, the directions in which liquid crystal molecules tilt during voltage application (during generation of an electric field) are defined with the slope face effect of the wall structure formed on the surface of the first substrate facing the liquid crystal layer in the shading region, so that an axisymmetrically aligned domain is formed. Also, a hole formed in the color filter layer of the second substrate opposed to the first substrate acts to fix the position of the center axis of the axisymmetric alignment at or near the hole, and this stabilizes the alignment of the axisymmetrically aligned domain.

Since the wall structure formed on the first substrate is located in the shading region, an axisymmetrically aligned domain can be formed without causing reduction in effective aperture ratio or contrast ratio.

The hole formed in the color filter layer may be a depression or a through hole. An inclined electric field is formed around the hole in the color filter layer as will be described later, and thus the hole acts to fix/stabilize the center of the axisymmetric alignment. For a hole having a stepped or inclined side face, the side face of the hole also has a function of defining the directions of tilt of liquid crystal molecules (shape effect) because liquid crystal molecules attempt to align themselves vertical to the side face of the hole (precisely, the surface of a vertical alignment film formed on the side face). The depth of the hole is preferably 20% or more of the thickness of the color filter layer.

To fix the center axis of the axisymmetric alignment further stably, an opening (first opening) may be formed in the first electrode at the position corresponding to the hole in the color filter layer. To further stabilize the axisymmetric alignment, a cut may be formed at a predetermined position of the first electrode. The directions in which liquid crystal molecules tilt are defined with an inclined electric field generated near the first opening and the cut formed in the first electrode, and thus the function described above is obtained.

The reduction in effective aperture ratio due to the existence of the opening can be minimized by placing the first opening formed in the first electrode and the hole in the color filter layer of the second substrate so as to at least overlap each other via the liquid crystal layer. Since one center axis is fixed/stabilized with the joint action of the first opening and the hole in the color filter layer, the action of the opening and the hole can be exerted more effectively.

According to the present invention, the position of the center axis of each axisymmetrically aligned liquid crystal domain is fixed/stabilized. As a result of the fixation of the center axes of the axisymmetrically aligned liquid crystal domains over the entire liquid crystal display panel, the uniformity of the display improves. Accordingly, the roughness of display recognized when grayscale display is viewed in a slanting direction is reduced, and also the response time in grayscale display can be shortened. In addition, as a result of the stabilization of the axisymmetric alignment, the time required to resume normal alignment from an alignment distortion occurring when the liquid crystal display panel is pressed (an afterimage due to pressing) can be shortened.

By forming an opening in the second electrode at the position corresponding to the hole in the color filter layer, the alignment regulating force with an inclined electric field can be increased to fix the center axis further stably. However, since no patterning is involved in formation of the counter electrode as the second electrode that covers roughly the entire surface of the liquid crystal panel, an additional step is required to form the second opening in the second electrode. On the contrary, patterning is involved in formation of the color filter layer to provide individual color layers. Holes can therefore be formed during this patterning with no additional step required. In other words, according to the present invention, the center axes of axisymmetric alignment can be fixed/stabilized without the necessity of forming second openings in the second electrode, that is, without the necessity of increasing the number of fabrication steps.

When the present invention is applied to a transflective LCD device, a transparent dielectric layer may be placed on the second substrate for control of the thickness of the liquid crystal layer. With this construction, an invalid region that does not contribute to display during transmission display can be reduced compared with the conventional transflective LCD device in which the transmission region and the reflection region are differentiated from each other by forming a step on the first substrate, and thus the brightness in transmission display can be improved. The diffuse reflection plate for improving the brightness in the reflection region may be provided on the first substrate in the reflection region. Otherwise, a light scattering layer (light diffuse layer) may be formed on the transparent dielectric layer on the second substrate. This can eliminate the necessity of forming projections and depressions on the surface of the reflection electrode.

BRIEF DESCRIPTION OF THE DRAWING

FIGS. 1A and 1B diagrammatically show one pixel of a transmissive LCD device 100 of an embodiment of the present invention, in which FIG. 1A is a plan view and FIG. 1B is a cross-sectional view taken along line 1B-1B' in FIG. 1A.

FIGS. 2A and 2B diagrammatically show one pixel of a transflective LCD device 200 of an embodiment of the present invention, in which FIG. 2A is a plan view and FIG. 2B is a cross-sectional View taken along line 2B-2B' in FIG. 2A.

FIGS. 6A and 6B are views diagrammatically showing liquid crystal molecules (shown by line segments in the figures) aligned 200 msec after application of a voltage that gives a relative transmittance of 10% to a liquid crystal layer, as well as equipotential lines of an electric field formed in the liquid crystal layer, in which FIG. 6A shows the case of providing no hole or opening and FIG. 6B shows the case of providing a hole in a color filter layer of a counter substrate and an opening in a pixel electrode.

DETAILED DESCRIPTION OF THE INVENTION

Hereinafter, LCD devices of an embodiment of the present invention will be described concretely with reference to the relevant drawings.

(Transmissive LCD Device)

Figure 1A:
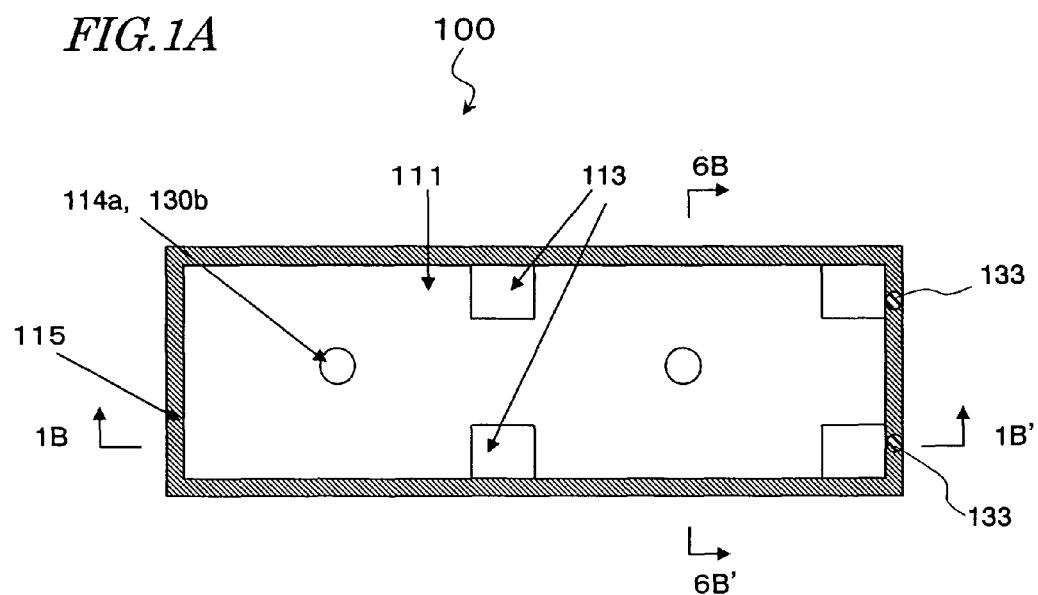
Figure 1B:
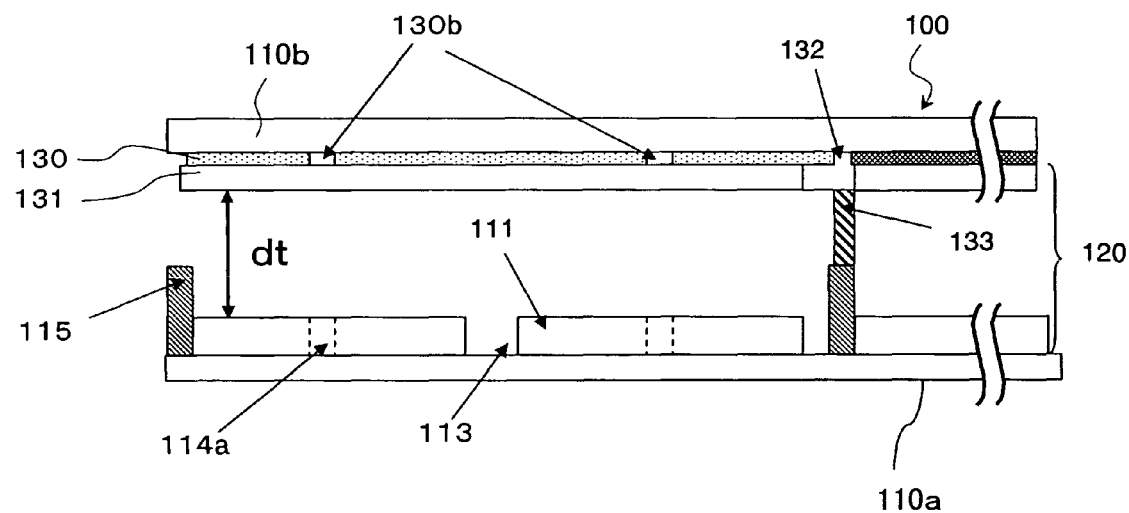

A transmissive LCD device 100 of the embodiment of the present invention will be described with reference to FIGS. 1A and 1B. FIGS. 1A and 1B diagrammatically show one pixel of the transmissive LCD device 100, in which FIG. 1A is a plan view and FIG. 1B is a cross-sectional view taken along line 1B-1B' in FIG. 1A.

Hereinafter, described will be the case that one pixel is divided into two parts (N=2). The number of parts into which one pixel is divided (=N) can also be three or more depending on the pixel pitch. In any case, the number of openings (=n) each to be positioned roughly in the center of a divided region on a second substrate is preferably the same as the number of divided parts (=N). The effective aperture ratio tends to decrease with increase of the number of divided parts (=N). Therefore, for an application to a high-definition display panel, the number of divided parts (=N) is preferably made small. The present invention is also applicable to the case involving no pixel division (this may be expressed as N=1). Each of the divided regions may be called a "sub-pixel". One liquid crystal domain is typically formed in each sub-pixel.

The LCD device 100 includes a transparent substrate (for example, a glass substrate) 110a, a transparent substrate 110b placed to face the transparent substrate 110a, and a vertically aligned liquid crystal layer 120 interposed between the transparent substrates 110a and 110b. Vertical alignment films (not shown) are formed on the surfaces of the substrates 110a and 110b facing the liquid crystal layer 120. During non-voltage application, therefore, liquid crystal molecules in the liquid crystal layer 120 are aligned roughly vertical to the surfaces of the vertical alignment films. The liquid crystal layer 120 includes a nematic liquid crystal material having negative dielectric anisotropy and also includes a chiral agent as required.

The LCD device 100 further includes pixel electrodes 111 formed on the transparent substrate 110a and a counter electrode 131 formed on the transparent substrate 110b. Each pixel electrode 111, the counter electrode 131 and the liquid crystal layer 120 interposed between these electrodes define a pixel. In the illustrated example, both the pixel electrodes 111 and the counter electrode 131 are formed of a transparent conductive layer (for example, an ITO layer). Typically, color filters 130 (the entire of the plurality of color filters may also be called a color filter layer 130) provided for the respective pixels, as well as a black matrix (shading layer) 132 formed in the gaps between the adjacent color filters 130, are formed on the surface of the transparent substrate 110b facing the liquid crystal layer 120, and the counter electrode 131 is formed on the color filters 130 and the black matrix 132. Alternatively, the color filters 130 and the black matrix 132 may be formed on the counter electrode 131 (on the surface thereof facing the liquid crystal layer 120).

In the LCD device 100 shown in FIGS. 1A and 1B, in which the number of divided parts (=N) is 2, a wall structure 115 to be described later extends on the transparent substrate 110a in a shading region around the pixel electrodes 111. The color filter layer 130 has holes 130b of the number corresponding to the number of divided parts (n=2 in the illustrated example) at predetermined positions. Each pixel electrode 111 has first openings 114a of the number corresponding to the number of divided parts (n=2 in the illustrated example) at predetermined positions in the pixel. The pixel electrode 111 also has four cuts 113 at predetermined positions. The first openings 114 and/or the cuts 114 in the pixel electrode 111 may be omitted. However, such openings and cuts can increase the effect of stabilizing axisymmetrically aligned domains and fixing/stabilizing the center axes of the domains. The axisymmetrically aligned domains are formed by providing at least the wall structure 115, and the center axes of the domains can be fixed/stabilized by providing the holes 130b in the color filter layer 130. The holes 130b herein may be depressions or through holes. Note that, although not illustrated in FIG. 1B for simplification, the second (counter) electrode 131 covering the holes 130b in the color filter 130 is actually depressed at the portions corresponding to the holes 130b.

The first openings 114a and the holes 130b in the color filter layer 130 are positioned to be superposed one on the other spatially via the liquid crystal layer 120. The first openings 114a and the holes 130b have the same size (diameter), and each pair of the first opening 114a the hole 130b coincide with each other when viewed from top as shown in FIG. 1A.

When a predetermined voltage is applied across the liquid crystal layer, two (number equal to the number of divided parts N) liquid crystal domains each having axisymmetric alignment are formed, with the center axes of the axisymmetric alignment thereof being in or near the holes 130b in the color filter layer 130 and the first opening 114a. The holes 130b and the openings 114a act to fix the positions of the center axes of the axisymmetrically aligned domains. With the placement of the hole 130b in the color filter layer 130 and the opening 114a in the pixel electrode 111 to be superposed one on the other via the liquid crystal layer as in the illustrated example, the reduction in effective aperture ratio due to the existence of the hole 130b and the first opening 114a can be minimized. In particular, one center axis can be fixed/stabilized with the action of the hole 130b in the color filter layer 130. The wall structure 115 acts to define the directions in which liquid crystal molecules tilt during voltage application (during generation of an electric field) with its slope face effect. The alignment regulating force of the side slopes of the wall structure 115 acts also during non-voltage application to tilt liquid crystal molecules.

The cuts 113, provided in the pixel electrode 111 near the boundaries of the axisymmetrically aligned domains, define the directions in which liquid crystal molecules fall with an electric field, and thus act to form the axisymmetrically aligned domains. An inclined electric field is generated around the pairs of openings 114a and the cuts 113 with a voltage applied between the pixel electrode 111 and the counter electrode 113. With this inclined electric field, together with the action of the electric field at the wall faces of the wall structure 115 distorted with the existence of the wall structure 115, the directions of tilt of liquid crystal molecules are defined, resulting in formation of the axisymmetric alignment as described above. In the illustrated example, a total of four cuts 113 are given point-symmetrically with respect to the pair of openings 114a corresponding to the center axis of a liquid crystal domain formed in the pixel (in this case, the right opening as viewed from FIG. 1A) (in this case, the entire pixel is a transmission region).

By providing the cuts 113 as described above, the directions in which liquid crystal molecules fall during voltage application are defined, allowing formation of two liquid crystal domains. The reason why no cuts are provided on the left side of the pixel electrode 111 as viewed from FIG. 1A is that substantially the same function is obtained from cuts provided on the right side of the adjacent pixel electrode (not shown) located left to the illustrated pixel electrode 111, and thus cuts, which may decrease the effective aperture ratio of the pixel, are omitted on the left side of the pixel electrode 111. Also, in the illustrated example, the wall structure 115 to be described later gives the alignment regulating force. Therefore, with no cuts provided on the left side of the pixel electrode 111, the resultant liquid crystal domain is as stable as a liquid crystal domain having such cuts. In addition, the effect of improving the effective aperture ratio is obtained.

Although a total of four cuts 113 were formed in the illustrated example, at least one cut between the adjacent liquid crystal domains is sufficient. For example, an elongate cut may be formed in the center of the pixel and the other cuts may be omitted.

The shape of the holes 130b in the color filter layer 130, the first openings 114a and the like acting to fix the center axes of the axisymmetrically aligned domains is preferably circular as illustrated. The shape is not limited to a circle, but to exert roughly equal alignment regulating force in all directions, the shape is preferably a polygon having four or more sides and also preferably a regular polygon.

The configuration and placement of the hole 130b and the first opening 114a are not limited to the illustrated example in which the hole 130b and the first opening 114a having the same size are superposed one on the other. However, by placing the hole 130b and the first opening 114a so that the hole 130b fixes one end of the center axis of the axisymmetric alignment of the liquid crystal domain while the first opening 114a fixes the other end of the center axis, the fixation of the center axis of the axisymmetric alignment can be further stabilized. Moreover, by placing the hole 130b and the first opening 114a to at least overlap each other via the liquid crystal layer, the reduction in effective aperture ratio due to the existence of the first openings 114 will be lessened.

The shape of the cuts 113 acting to define the directions in which liquid crystal molecules in the axisymmetrically aligned domains fall with the electric field is determined so that roughly equal alignment regulating force is exerted for the adjacent axisymmetrically aligned domains. For example, a square is preferred. The cuts may be omitted.

The LCD device 100 has a shading region surrounding each of the pixels, and the wall structure 115 is placed on the transparent substrate 110a in the shading region. The shading region as used herein refers to a region shaded from light due to the presence of TFTs, gate signal lines and source signal lines formed on the peripheries of the pixel electrodes 111 on the transparent substrate 110a, or the presence of the black matrix formed on the transparent substrate 110b, for example. Since this region does not contribute to display, the wall structure 115 formed in the shading region is free from adversely affecting the display.

The illustrated wall structure 115 is a continuous wall surrounding the pixel. Alternatively, the wall structure 115 may be composed of a plurality of separate walls. The wall structure 115, which serves to define boundaries of liquid crystal domains located near the outer edges of the pixel, should preferably have a length of some extent. For example, when the wall structure is composed of a plurality of walls, each wall is preferably longer than the gap between the adjacent walls.

Supports 133 for defining the thickness of the liquid crystal layer 120 (also called the cell gap) are preferably formed in the shading region (in the illustrated example, the region defined by the black matrix 132) to avoid degradation in display quality due to the supports. Although the supports 133 are formed on the wall structure 115 provided in the shading region in the illustrated example, the supports 133 may be formed on either transparent substrate 110a or 110b. In the case of forming the supports 133 on the wall structure 115, setting is made so that the sum of the height of the wall structure 115 and the height of the supports 133 is equal to the thickness of the liquid crystal layer 120. If the supports 133 are formed in a region having no wall structure 115, setting is made so that the height of the supports 133 is equal to the thickness of the liquid crystal layer 120. The supports 133 can be formed by photolithography using a photosensitive resin, for example.

In the LCD device 100, the following is presumed. When a predetermined voltage (voltage equal to or higher than a threshold voltage) is applied between the pixel electrode 111 and the counter electrode 131, two axisymmetrically aligned liquid crystal domains are formed with their center axes being stabilized in or near the holes 130b in the color filter layer 130 and the first openings 114a formed in the pixel electrode 111. The electric field distorted with the wall faces of the wall structure 115 and the wall face effect of the wall structure 115 mainly define the directions in which liquid crystal molecules in the two adjacent liquid crystal domains fall with an electric field. Also, the inclined electric field generated near the pair of cuts 133 acts to define the directions in which liquid crystal molecules in the two adjacent liquid crystal domains fall with an electric field. Such alignment regulating forces act cooperatively, to stabilize the alignment of the liquid crystal domains.

As described above, in the LCD device 100 of this embodiment, the positions of the center axes of the axisymmetric alignment of the liquid crystal domains formed for the two sub-pixels are fixed/stabilized. As a result of the fixation of the center axes of the axisymmetrically aligned liquid crystal domains over the entire liquid crystal display panel, the uniformity of the display improves. Also, as a result of the stabilization of the axisymmetric alignment, the response time in grayscale display can be shortened. Moreover, occurrence of an afterimage due to pressing of the liquid crystal display panel can be reduced (the time required to resume from the pressing can be shortened).

On the surface of the transparent substrate 110a facing the liquid crystal layer 120, provided are active elements such as TFTs and circuit elements such as gate signal lines and source signal lines connected to TFTs (all of these elements are not shown). Herein, the transparent substrate 110a, together with the circuit elements and the pixel electrodes 111, the wall structure 115, the supports 133, the alignment film and the like described above formed on the transparent substrate 110a, are collectively called an active matrix substrate in some cases. Likewise, the transparent substrate 110b, together with the color filter layer 130, the black matrix 132, the counter electrode 131, the alignment film and the like formed on the transparent substrate 110b, are collectively called a counter substrate or a color filter substrate in some cases. The supports 133 may be formed either on the active matrix substrate or on the color filter substrate.

Although omitted in the above description, the LCD device 100 further includes a pair of polarizing plates placed to face each other via the transparent substrates 110a and 110b. The polarizing plates are typically placed so that their transmission axes are orthogonal to each other. The LCD device 100 may further include a biaxial optical anisotropic medium layer and/or a uniaxial optical anisotropic medium layer, as will be described later.

(Transflective LCD Device)

Next, a transflective LCD device 200 of an embodiment of the present invention will be described with reference to FIGS. 2A and 2B.

Figure 2A:
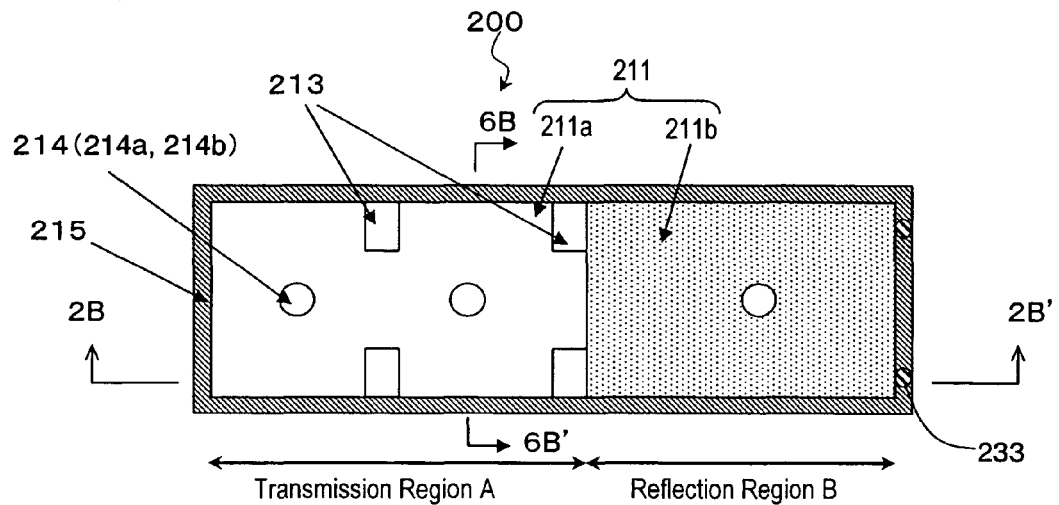
Figure 2B:
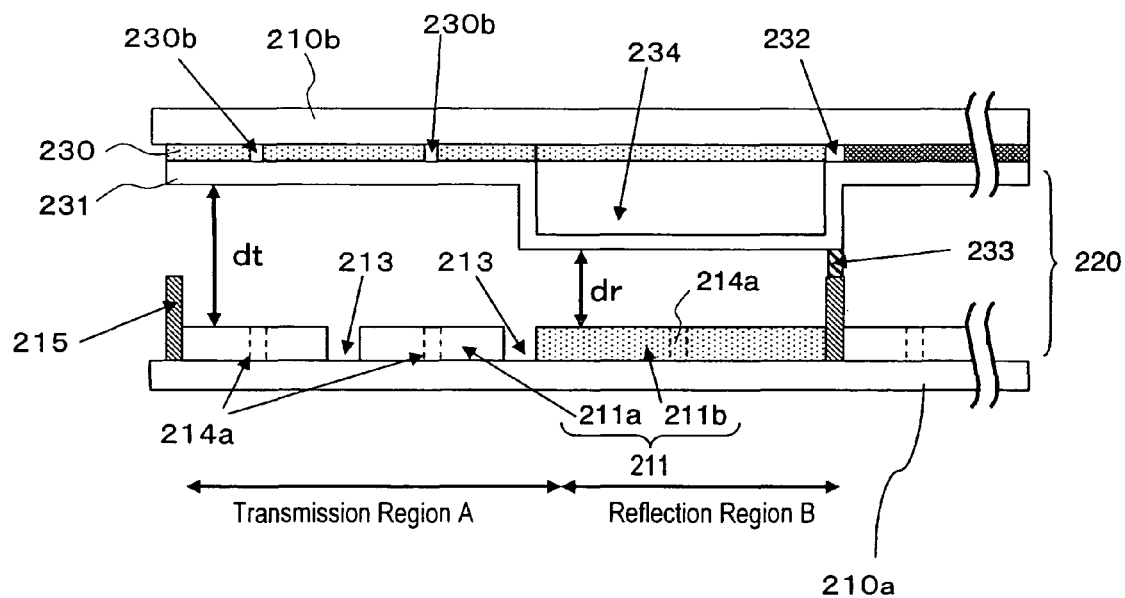

FIGS. 2A and 2B diagrammatically show one pixel of the transflective LCD device 200 of the embodiment of the present invention, in which FIG. 2A is a plan view and FIG. 2B is a cross-sectional view taken along line 2B-2B' in FIG. 2A.

Hereinafter, described will be a case that one pixel is divided into three parts (N=3; two for the transmission region and one for the reflection region). The number of parts into which one pixel is divided (=N) can be at least two (at least one for the transmission region and at least one for the reflection region) determined depending on the pixel pitch. The number of holes (=n) in the color filter layer each to be positioned roughly in the center of a divided region (region in which an axisymmetrically aligned domain is formed) on the counter substrate (second substrate) is preferably the same as the number of divided parts (=N). Note however that if a transparent dielectric layer is selectively formed on the surface of the counter substrate facing the liquid crystal layer in the reflection region, to be described later, no hole may be formed in the color filter in the reflection region. The effective aperture ratio tends to decrease with increase of the number of divided parts (=N). Therefore, for an application to a high-definition display panel, the number of divided parts (=N) is preferably made small. However, by making holes in the color filter layer to provide color filter-free regions in each pixel regularly, absorption of light with the color filter layer will be lessened, and thus the transmittance will substantially increase.

The LCD device 200 includes a transparent substrate (for example, a glass substrate) 210a, a transparent substrate 210b placed to face the transparent substrate 210a, and a vertically aligned liquid crystal layer 220 interposed between the transparent substrates 210a and 210b. Vertical alignment films (not shown) are formed on the surfaces of the substrates 210a and 210b facing the liquid crystal layer 220. During non-voltage application, therefore, liquid crystal molecules in the liquid crystal layer 220 are aligned roughly vertical to the surfaces of the vertical alignment films. The liquid crystal layer 220 includes a nematic liquid crystal material having negative dielectric anisotropy and also includes a chiral agent as required.

The LCD device 200 further includes pixel electrodes 211 formed on the transparent substrate 210a and a counter electrode 231 formed on the transparent substrate 210b. Each pixel electrode 211, the counter electrode 231 and the liquid crystal layer 220 interposed between these electrodes define a pixel. Circuit elements such as TFTs are formed on the transparent substrate 210a as will be described later. Herein, the transparent substrate 210a and the components formed thereon are collectively called an active matrix substrate 210a in some cases.

Typically, color filters 230 (the entire of the plurality of color filters may also be called a color filter layer 230) provided for the respective pixels, as well as a black matrix (shading layer) 232 provided in the gaps between the adjacent color filters 230, are formed on the surface of the transparent substrate 210b facing the liquid crystal layer 2220, and the counter electrode 231 is formed on the color filters 230 and the black matrix 232. Alternatively, the color filters 230 and the black matrix 232 may be formed on the counter electrode 231 (on the surface thereof facing the liquid crystal layer 220). Herein, the transparent substrate 210b and the components formed thereon are collectively called a counter substrate (color filter substrate) 210b in some cases.

Each pixel electrode 211 includes a transparent electrode 211a formed of a transparent conductive layer (for example, an ITO layer) and a reflective electrode 211b formed of a metal layer (for example, an Al layer, an Al-including alloy layer, and a multilayer film including any of these layers). Having such a pixel electrode, each pixel includes a transmission region A defined by the transparent electrode 211a and a reflection region B defined by the reflective electrode 211b, to provide display in the transmission mode and display in the reflection mode, respectively.

In the LCD device 200 shown in FIGS. 2A and 2B, in which the number of divided parts (=N) is 3 (two for the transmission region and one for the reflection region), holes 230b of the number corresponding to the number of divided parts (n=2 in the illustrated example) are formed in the color filter layer 230 of the counter color filter substrate 210b at positions roughly in the centers of liquid crystal domains corresponding to the divided regions in the transmission region A, while no hole is formed in the divided region in the reflection region B. The reasons for this are as follows. With a transparent dielectric layer 234 selectively formed on the surface of the counter substrate facing the liquid crystal layer in the reflection region B, the alignment regulation effect of the hole 230b will hardly be exerted. Also, since the display quality (for example, the contrast ratio) is low in the reflection mode compared with that in the transmission mode, lack of alignment uniformity in the reflection region B, if any, will not affect the display quality. No problem will therefore arise by omitting the hole for fixing/stabilizing the center axis. Naturally, a hole may be formed in the transparent dielectric layer 234, in place of forming a hole in the color filter layer 230, to fix/stabilize the center axis of the axisymmetric alignment.

On the active matrix substrate 210a, a wall structure 215 to be described later extends in a shading region around each pixel electrode 211. The pixel electrode 211 has first openings 214a of the number corresponding to the number of divided parts (n=3 in the illustrated example) at predetermined positions in the pixel. That is, the pixel electrode 211 has two first openings 214a in the transmission region A and one first opening 214a in the reflection region B. The pixel electrode 211 also has four cuts 213 at predetermined positions.

The first openings 214a and/or the cuts 213 in the pixel electrode 211 may be omitted. However, such openings and cuts can increase the effect of stabilizing axisymmetrically aligned domains and fixing/stabilizing the center axes of the domains. The axisymmetrically aligned domains are formed by providing at least the wall structure 215, and the center axes of the domains can be fixed/stabilized by providing the holes 230b in the color filter layer 230. The holes 230b may be depressions or through holes.

When a predetermined voltage is applied across the liquid crystal layer, three (number equal to the number of divided parts N) liquid crystal domains each having axisymmetric alignment are formed, with the center axes of the axisymmetric alignment of the liquid crystal domains being positioned in or near the holes 230b in the color filter layer and/or the first openings 214a. When each hole 230b in the color filter layer 230 and each first opening 214a are placed to be superposed one on the other in the transmission region A as in the illustrated example, the reduction in effective aperture ratio due to the existence of the first opening 214a can be minimized. In the reflection region B, the first opening 214a in the pixel electrode 211 acts to fix/stabilize the center axis of the axisymmetric alignment.

The wall structure 215 formed on the first substrate acts to define the directions in which liquid crystal molecules tilt during voltage application (during generation of an electric field) with its slope face effect. Moreover, the cuts 213, which are formed as required near a boundary between axisymmetrically aligned domains, act to define the directions in which liquid crystal molecules tilt with an electric field, to form the axisymmetrically aligned domains. An inclined electric field is generated around the cuts 213 with the application of a voltage between the pixel electrode 211 and the counter electrode 213. With this inclined electric field, acting together with an electric field at the wall faces distorted with the wall structure 215, the directions of tilt of liquid crystal molecules are defined, resulting in formation of the axisymmetric alignment as described above.

In the illustrated example, a total of four cuts 213 are given point-symmetrically with respect to the opening 214a corresponding to the center axis of a liquid crystal domain formed in the transmission region A of the pixel (in this case, the right opening in the transmission region A as viewed from FIG. 2A). With these cuts 213, the directions in which liquid crystal molecules fall during voltage application are defined, resulting in formation of three liquid crystal domains. The placement and preferred shapes of the wall structure 215, the openings 214 and the cuts 213 are the same as those described above in relation to the transmissive LCD device 100.

In the example illustrated in FIGS. 2A and 2B, the transmission region A has two liquid crystal domains and the reflection region B has one liquid crystal domain. However, the arrangement is not limited to this. Each liquid crystal domain is preferably roughly square in shape from the standpoint of the viewing angle characteristics and the stability of alignment.

The LCD device 200 has a shading region around each pixel, and the wall structure 215 extends on the transparent substrate 210a in the shading region. Since the shading region does not contribute to display, the wall structure 215 formed in the shading region is free from adversely affecting the display. The wall structure 215 shown in the illustrated example is a continuous wall surrounding the pixel. Alternatively, the wall structure 215 may be composed of a plurality of separate walls. The wall structure 215, which serves to define boundaries of liquid crystal domains located near the outer edges of the pixel, should preferably have a length of some extent.

Supports 233 for defining the thickness of the liquid crystal layer 220 (also called the cell gap) should preferably be formed in the shading region (in the illustrated example, the region defined by the black matrix 232) to avoid degradation of the display quality due to the supports. Although the supports 233 are formed on the wall structure 215 provided in the shading region in the illustrated example, the supports 233 may be formed on either transparent substrate 210a or 210b. In the case of forming the supports 233 on the wall structure 215, setting is made so that the sum of the height of the wall structure 215 and the height of the supports 233 is equal to the thickness of the liquid crystal layer 220. If the supports 233 are formed in a region having no wall structure 215, setting is made so that the height of the supports 233 is equal to the thickness of the liquid crystal layer 220.

In the LCD device 200, when a predetermined voltage (voltage equal to or higher than a threshold voltage) is applied between the pixel electrode 211 and the counter electrode 231, two axisymmetrically aligned domains are formed in the transmission region A, and one axisymmetrically aligned domain is formed in the reflection region B. The electric field distorted with the wall faces of the wall structure 215 and the wall face effect of the wall structure 215 mainly define the directions in which liquid crystal molecules in the three adjacent liquid crystal domains (two in the transmission region and one in the reflection region) fall with an electric field. Also, the inclined electric field generated near the four cuts 233 acts to define the directions in which liquid crystal molecules in the three adjacent liquid crystal domains fall with the electric field. Such alignment regulating forces act cooperatively, to stabilize the axisymmetric alignment of the liquid crystal domains. Moreover, the center axes of the two axisymmetrically aligned liquid crystal domains formed in the transmission region A are fixed in or near the holes 230b in the color filter layer 230 and the first openings 214a formed roughly in the centers of the divided regions in the pixel, and stabilized. The center axis of the one axisymmetrically aligned liquid crystal domain formed in the reflection region B is fixed/stabilized with the first opening 214a formed roughly in the center of the reflection region B.

A preferred construction specific to the transflective LCD device 200 permitting both the transmission-mode display and the reflection-mode display will be described.

While light used for display passes through the liquid crystal layer 220 once in the transmission-mode display, it passes through the liquid crystal layer 220 twice in the reflection-mode display. Accordingly, as diagrammatically shown in FIG. 2B, the thickness dt of the liquid crystal layer 220 in the transmission region A is preferably set roughly double the thickness dr of the liquid crystal layer 220 in the reflection region B. By setting in this way, the retardation given to the light by the liquid crystal layer 220 can be roughly the same in both display modes. Most preferably, dr=0.5 dt should be satisfied, but good display is secured in both display modes as long as 0.3 dt<dr<0.7 dt is satisfied. Naturally, dt=dr may be satisfied depending on the use.

In the LCD device 200, a transparent dielectric layer 234 is provided on the glass substrate 210b only in the reflection region B to make the thickness of the liquid crystal layer 220 in the reflection region B smaller than that in the transmission region A. This construction eliminates the necessity of providing a step by forming an insulating film and the like under the reflective electrode 211b, and thus has an advantage of simplifying the fabrication of the active matrix substrate 210a. If the reflective electrode 211b is formed on such an insulting film provided to give a step for adjusting the thickness of the liquid crystal layer 220, light used for transmission display will be shaded with the reflective electrode covering a slope (tapered face) of the insulating film, or light reflected from the reflective electrode formed on a slope of the insulating film will repeat internal reflection, failing to be effectively used even for reflection display. By adopting the construction described above, occurrence of such problems is prevented, and thus the light use efficiency can be improved.

If the transparent dielectric layer 234 is provided with a function of scattering light (diffuse reflection function), white display close to good paper white can be realized without the necessity of providing the reflective electrode 211b with the diffuse reflection function. Such white display close to paper white can also be realized by making the surface of the reflective electrode 211b uneven, and in this case, no light scattering function is necessary for the transparent dielectric layer 234. However, the uneven surface may fail to stabilize the position of the center axis of the axisymmetric alignment depending on the shape of the uneven surface. On the contrary, by combining the transparent dielectric layer 234 having the light scattering function and the reflective electrode 211b having a flat surface, the position of the center axis can be stabilized with the opening 214a formed in the reflective electrode 211b more reliably. Naturally, if the opening 214b is provided in the counter electrode 231 in the reflection region B, the center axis of the axisymmetric alignment will be further stabilized. Note that in the case of making the surface of the reflective electrode 211b uneven to provide the reflective electrode 211b with the diffuse reflection function, the uneven shape is preferably a continuous wave shape to prevent occurrence of an interference color, and such a shape is preferably set to allow stabilization of the center axis of the axisymmetric alignment.

While light used for display passes through the color filter layer 230 once in the transmission mode, it passes through the color filter layer 230 twice in the reflection mode. Accordingly, if the color filter layer 230 has the same optical density both in the transmission region A and the reflection region B, the color purity and/or the luminance may decrease in the reflection mode. To suppress occurrence of this problem, the optical density of the color filter layer in the reflection region is preferably made lower than that in the transmission region. The optical density as used herein is a characteristic value characterizing the color filter layer. For example, the optical density can be reduced by reducing the thickness of the color filter layer. Otherwise, the optical density can be reduced by reducing the density of a pigment added, for example, while keeping the thickness of the color filter layer unchanged. Forming a color filter layer different in color layer between the transmission region A and the reflection region B in the way described above is greatly effective for improvement of the display color reproducibility.

Figure 3:
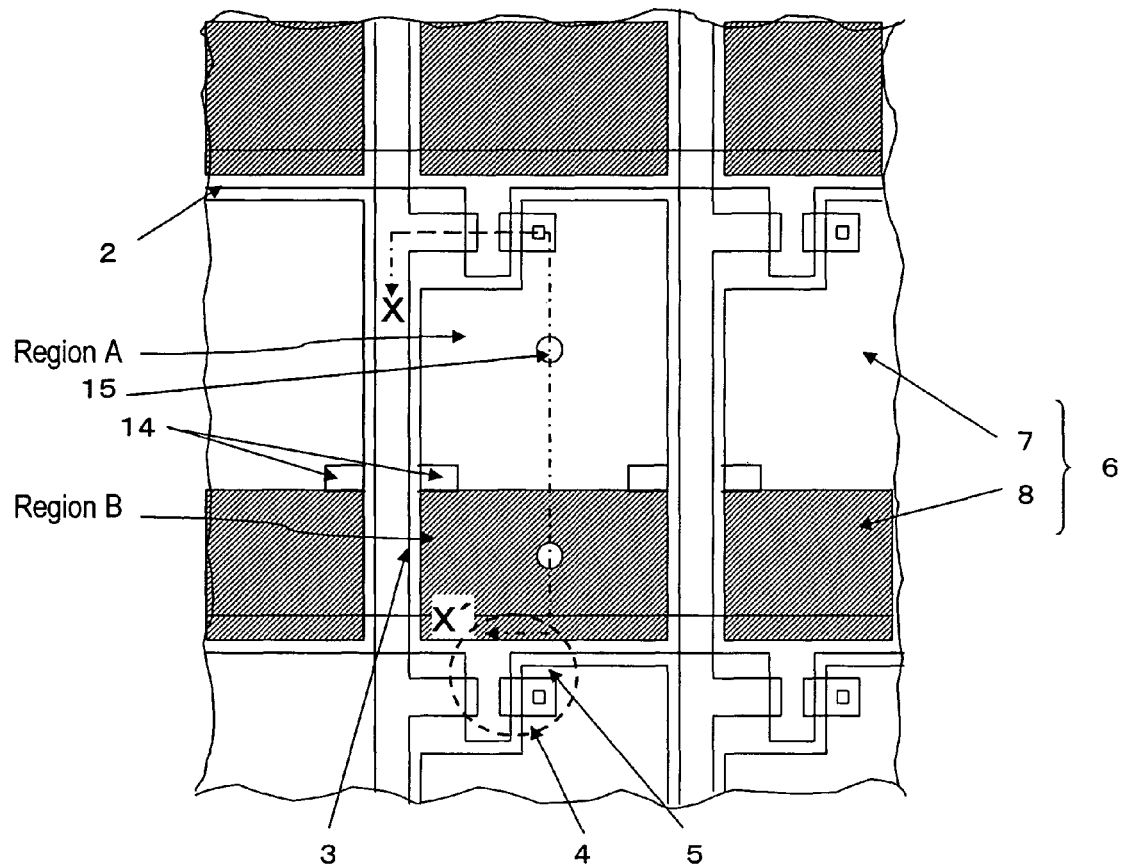
FIG. 3 is a plan view of an active matrix substrate 210a of the transflective LCD device 200.
Figure 4:
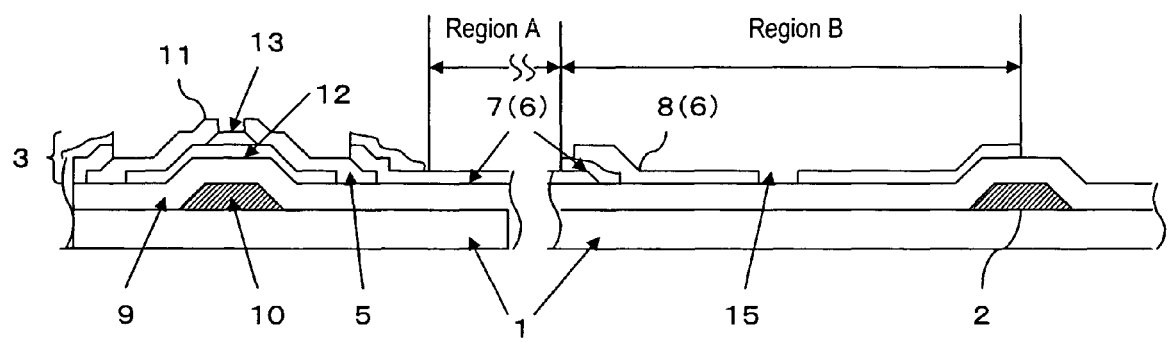
FIG. 4 is a cross-sectional view of the active matrix substrate 210a of the transflective LCD device 200.

Next, referring to FIGS. 3 and 4, an example of the structure of an active matrix substrate suitably used for the transflective LCD device will be described. FIG. 3 is a partial enlarged view of the active matrix substrate, and FIG. 4 is a cross-sectional view taken along line X-X' in FIG. 3. The active matrix substrate shown in FIGS. 3 and 4 can be the same in construction as the active matrix substrate 211a shown in FIGS. 2A and 2B, except that one liquid crystal domain is formed in the transmission region A (that is, the numbers of the openings 214 and the cuts 213 are reduced).

The active matrix substrate shown in FIGS. 3 and 4 has a transparent substrate 1 made of a glass substrate, for example. Gate signal lines 2 and source signal lines 3 run on the transparent substrate 1 to cross each other at right angles. TFTs 4 are formed near the crossings of these signal lines 2 and 3. Drain electrodes 5 of the TFTs 4 are connected to corresponding pixel electrodes 6.

Each of the pixel electrode 6 includes a transparent electrode 7 made of a transparent conductive layer such as an ITO layer and a reflective electrode 8 made of Al and the like. The transparent electrode 7 defines a transmission region A, and the reflective electrode 8 defines a reflection region B. Cuts 14 are formed at predetermined positions of the pixel electrode 6 for controlling the alignment of the axisymmetrically aligned domains as described above. Also, a wall structure (not shown) is formed in a non-display region outside each pixel (shading region) where signal lines extend, for defining the aligned state of the axisymmetrically aligned domains.

The pixel electrode 6 overlaps the gate signal line for the next row via a gate insulating film 9, forming a storage capacitance. The TFT 4 has a multilayer structure including the gate insulating film 9, a semiconductor layer 12, a channel protection layer 13 and an n$^+$-Si layer 11 (source/drain electrodes) formed in this order on a gate electrode 10 branched from the gate signal line 2.

The illustrated TFT is of a bottom gate type. The TFT is not limited to this type, but a top gate type TFT can also be used.

As described above, in the LCD 200 having the construction shown in FIGS. 2A and 2B, the center axes of the axisymmetrically aligned liquid crystal domains formed in the transmission region A are fixed and stabilized with the holes 230$b$ in the color filter layer 230 and the first openings 214$a$ in the pixel electrode 211. The center axis of the axisymmetrically aligned liquid crystal domain formed in the reflection region B is fixed and stabilized with the first opening 214$a$ in the pixel electrode 211. As a result of the fixation of the center axes of the axisymmetrically aligned liquid crystal domains over the entire liquid crystal display panel, the uniformity of the display improves, as in the LCD device 100. Also, as a result of the stabilization of the axisymmetric alignment, the response time in grayscale display can be shortened. Moreover, occurrence of an afterimage due to pressing of the liquid crystal display panel can be reduced (the time required to resume from the pressing can be shortened).

Furthermore, with the placement of the transparent dielectric layer 234 and/or the color filter 230 in the manner described above, the display brightness and color purity in both the transmission mode and the reflection mode can be improved.

(Operation Principle)

The reason why the LCD device having a vertically aligned liquid crystal layer of the embodiment of the present invention has excellent wide viewing angle characteristics will be described with reference to FIGS. 5A and 5B.

Figure 5A:
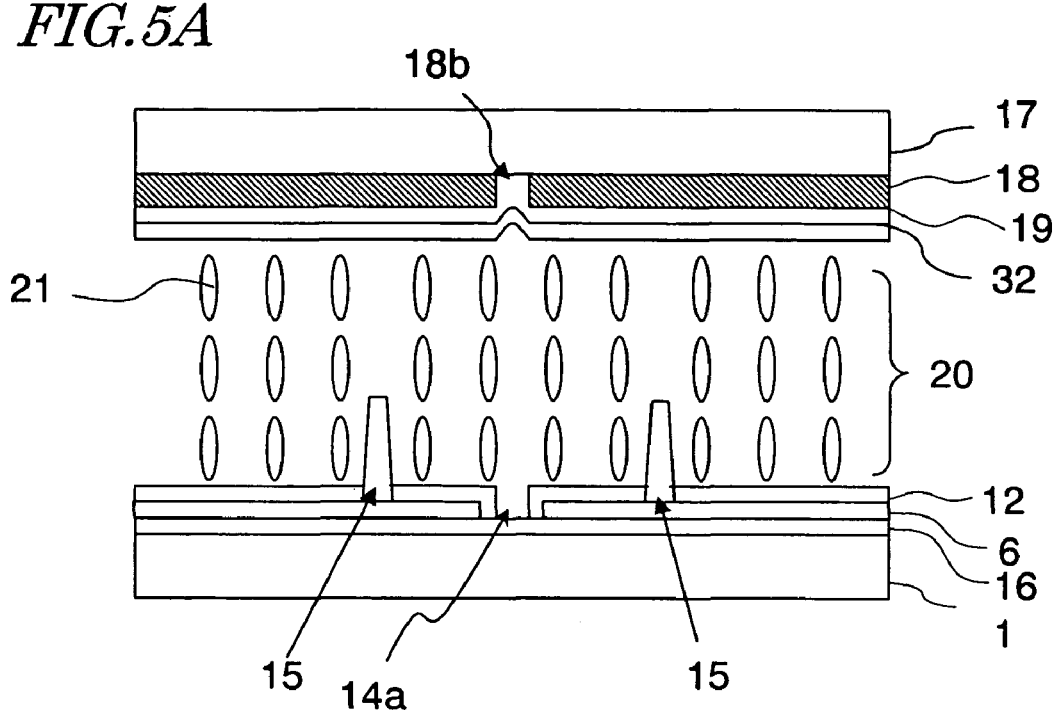
FIGS. 5A and 5B are diagrammatic views for demonstrating the operation principle of the LCD devices of the embodiments of the present invention, showing the states during non-voltage application (FIG. 5A) and during voltage application (FIG. 5B).
Figure 5B:
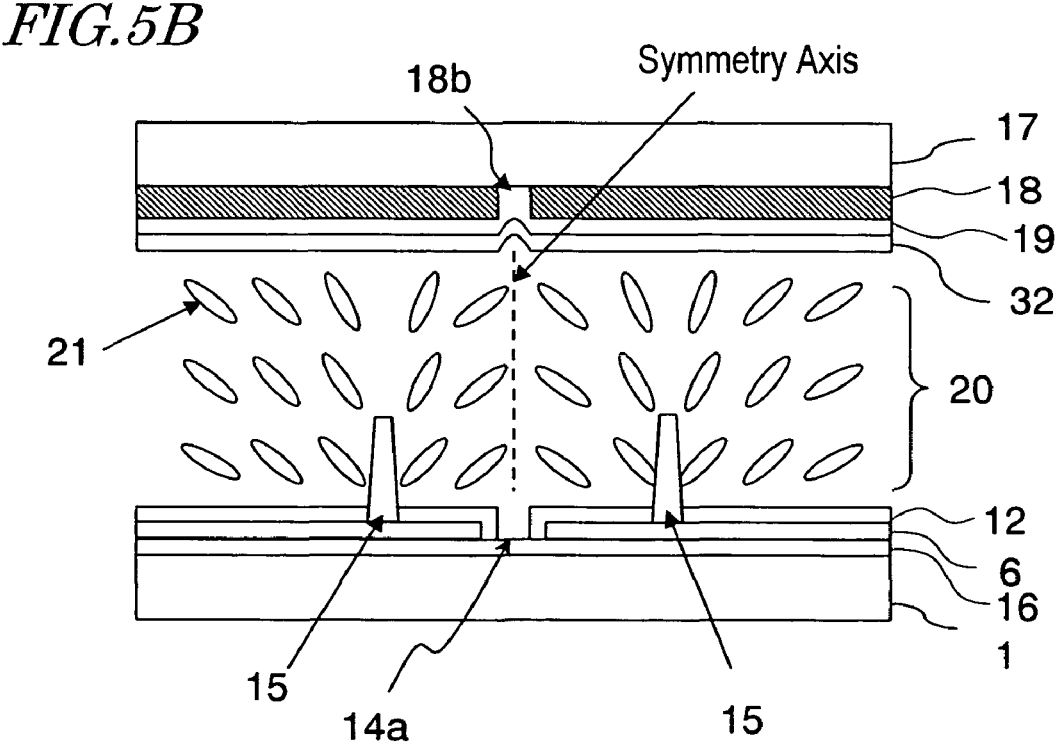

FIGS. 5A and 5B are views for demonstrating how the alignment regulating forces of a wall structure 15 and an opening 14$a$ formed on the active matrix substrate and a hole 18$b$ formed in a color filter layer 18 of the color filter substrate act, in which the aligned states of liquid crystal molecules during non-voltage application (FIG. 5A) and during voltage application (FIG. 5B) are diagrammatically shown. The state shown in FIG. 5B is for display of a grayscale level.

The LCD device shown in FIGS. 5A and 5B includes an insulating film 16, a pixel electrode 6 having the opening 14$a$ at a predetermined position, the wall structure 15 and an alignment film 12 formed in this order on a transparent substrate 1. The LCD device also includes the color filter layer 18 having the hole 18$b$ (through hole in the illustrated example) at a predetermined position, a counter electrode 19 and an alignment film 32 formed in this order on another transparent substrate 17. A liquid crystal layer 20 interposed between the two substrates includes liquid crystal molecules 21 having negative dielectric anisotropy.

As shown in FIG. 5A, during non-voltage application, the liquid crystal molecules 21 are aligned roughly vertical to the substrate surface with the alignment regulating force of the vertical alignment films 12 and 32.

As shown in FIG. 5B, during voltage application, the liquid crystal molecules 21 having negative dielectric anisotropy attempt to make their major axes vertical to electric lines of force, and this causes the directions in which the liquid crystal molecules 21 fall to be defined with an inclined electric field generated around the opening 14$a$ and cuts and distortion in electric field occurring at the hole 18$b$ in the color filter layer 18 and the side faces (wall faces) of the wall structure 15 together with the alignment regulating force of the wall structure 15. In this way, the liquid crystal molecules 21 are aligned axisymmetrically around the hole 18$b$ and the opening 14$a$ as the center. In the resultant axisymmetrically aligned domain, liquid crystal directors point in all directions (directions in the substrate plane), and thus, excellent viewing angle characteristics can be obtained.

As described above, the hole also serves to improve the transmittance of the color filter layer.

Although the action of the inclined electric field generated around the hole 18$b$ in the color filter layer 18 and the opening 14$a$ and the alignment regulating force of the wall structure 15 were referred to in the above description, an inclined electric field is also generated around cuts formed at edges of the pixel electrode 6, and the directions of the tilt of the liquid crystal molecules 21 are also defined with this inclined electric field.

Hereinafter, referring to FIGS. 6A and 6B, the mechanism with which an opening formed in the pixel electrode and an opening formed in the counter electrode effectively stabilize the center axis of axisymmetric alignment in the LCD device of an embodiment of the present invention will be described.

Figure 6A:
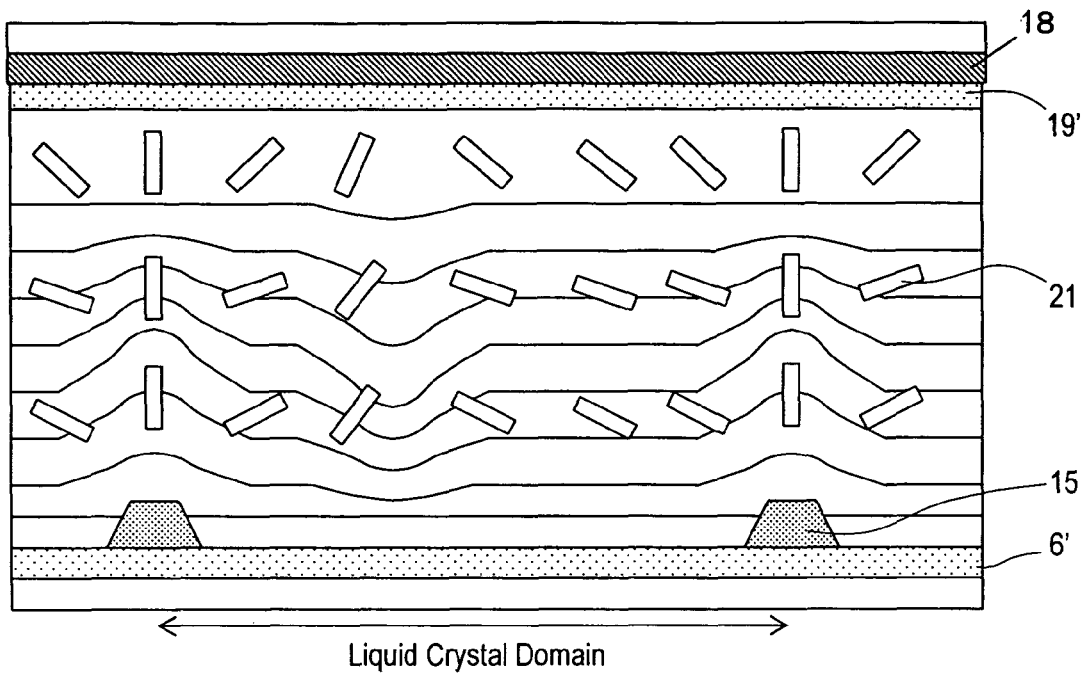
Figure 6B:
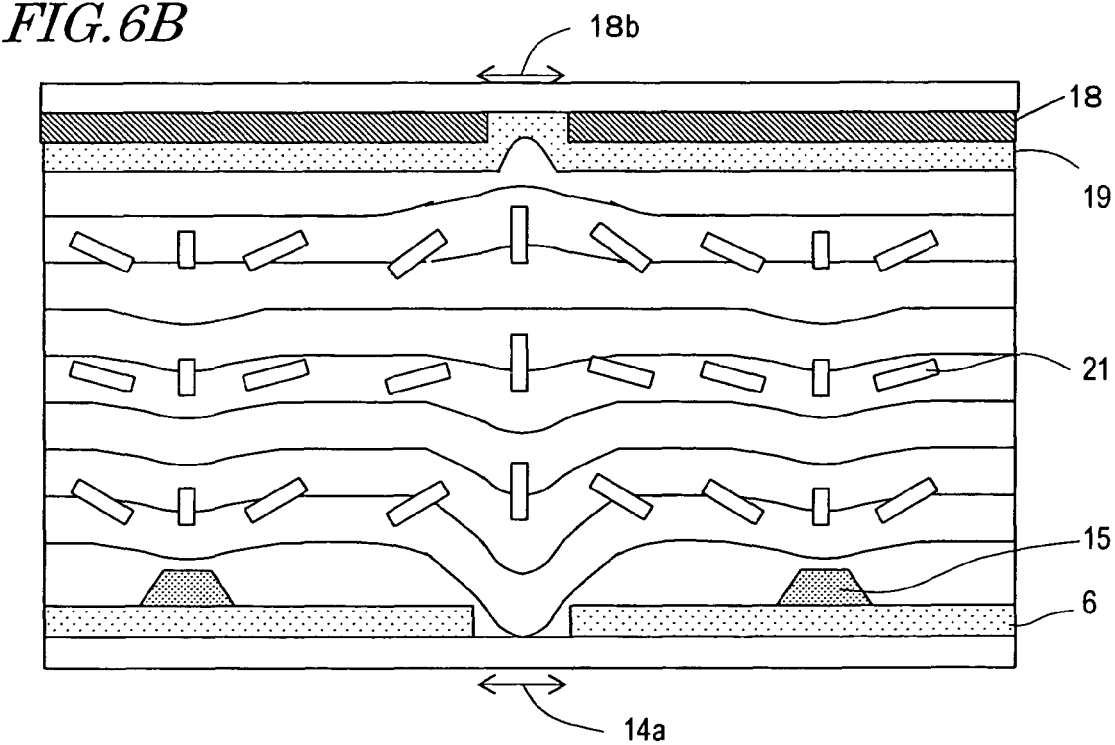

FIGS. 6A and 6B are views diagrammatically illustrating the aligned state of liquid crystal molecules (shown as line segments in FIGS. 6A and 6B) 200 msec after application of a voltage that gives a relative transmittance of 10% to a liquid crystal layer (3V in this case), together with equipotential lines of an electric field generated in the liquid crystal layer at that time, where FIG. 6A shows the case of providing no hole or opening in each pixel and FIG. 6B shows the case of providing a hole 18$b$ in a color filter layer 18 and an opening 14$a$ in a pixel electrode 6. FIGS. 6A and 6B correspond to a cross-sectional view taken along line 6B-6B' in FIG. 1A and FIG. 2A. FIGS. 6A and 6B show the results of an electric field simulation conducted under the conditions that the thickness of the liquid crystal layer is 4.0 µm, the dielectric constant of the liquid crystal material is −4.5, and the refractive indexes no=1.485 and ne=1.495.

As shown in FIG. 6A, in which the color filter layer 18 has no hole and neither an pixel electrode 6' nor a counter electrode 19' has an opening, the center axis of the axisymmetric alignment of liquid crystal molecules 21 may not be fixed effectively in a fixed region, failing to be formed in the center between the walls of the wall structure 15.

By forming the hole 18$b$ in the color filter layer and the opening 14$a$ in the pixel electrode 6 near the center between the walls of the wall structure 15 as shown in FIG. 6B, the center axis of the axisymmetric alignment of the liquid crystal molecules 21 is fixed in the hole 18$b$ and the opening 14$a$ and thus stabilized. The liquid crystal molecules 21 located near the center of the liquid crystal domain (near the center between the walls of the wall structure 15) are aligned vertically and serve together as the center axis of the axisymmetric alignment. This phenomenon occurs due to the action of an inclined electric field that is generated with attraction of the equipotential lines into the hole 18$b$ in the color filter layer 18 and the opening 14$a$ in the pixel electrode 6, and also due to the shape effect of the hole 18$b$ in the color filter layer 18.

The liquid crystal molecules 21, staying roughly uniformly in their vertically aligned state immediately after the voltage application, gradually shift to axisymmetric alignment with time with the center axis being positioned at and around the center of the liquid crystal domain, and thus are fixed/stabilized. The shape of the hole 18$b$ in the color filter layer 18 and the opening 14a in the pixel electrode 6 is preferably circular but not limited to this. To exert roughly equal alignment regulating force in all directions, the shape is preferably a polygon having four or more sides and also preferably a regular polygon.

In the embodiment of the present invention, the holes (depressions or through holes) in the color filter layer, acting to fix/stabilize the center axes of axisymmetric alignment, can be formed during formation of the color filter layer 18 by patterning in a photolithographic process. Specifically, in exposure of a negative photosensitive resin film including R (red), G (green) and B (blue) color layers, a region smaller in exposure amount than the other region is formed at a predetermined position (position at which the hole is to be formed) in each pixel, and the resultant exposed photosensitive resin film is developed, to thereby form a hole at the predetermined position. The exposure amount can be adjusted with a known photomask such as a shading mask and a dimming mask.

The holes act not only to fix/stabilize the center axes of axisymmetric alignment by distorting equipotential lines, but also to improve the transmittance of the color filter layer, for example.

In the process of forming the holes in the color filter layer, the side faces of the holes can be stepped or slowly inclined by adopting multi-step exposure and half exposure using shading masks different in shape and size. By regulating the directions of alignment of liquid crystal molecules with such side faces, the effect of fixing/stabilizing the center axes of the axisymmetric alignment can be further improved.

According to the fabrication method described above, holes for fixing/stabilizing the positions of the center axes of the axisymmetric alignment can be formed during patterning of the color filter layer by photolithography in the process of fabricating the color filter substrate, only by changing the photomask, without the necessity of addition of a new step. This fabrication method is simpler compared with a fabrication method in which openings are formed in the counter electrode.

The construction of an LCD device according to the present invention will be described.

Figure 7:
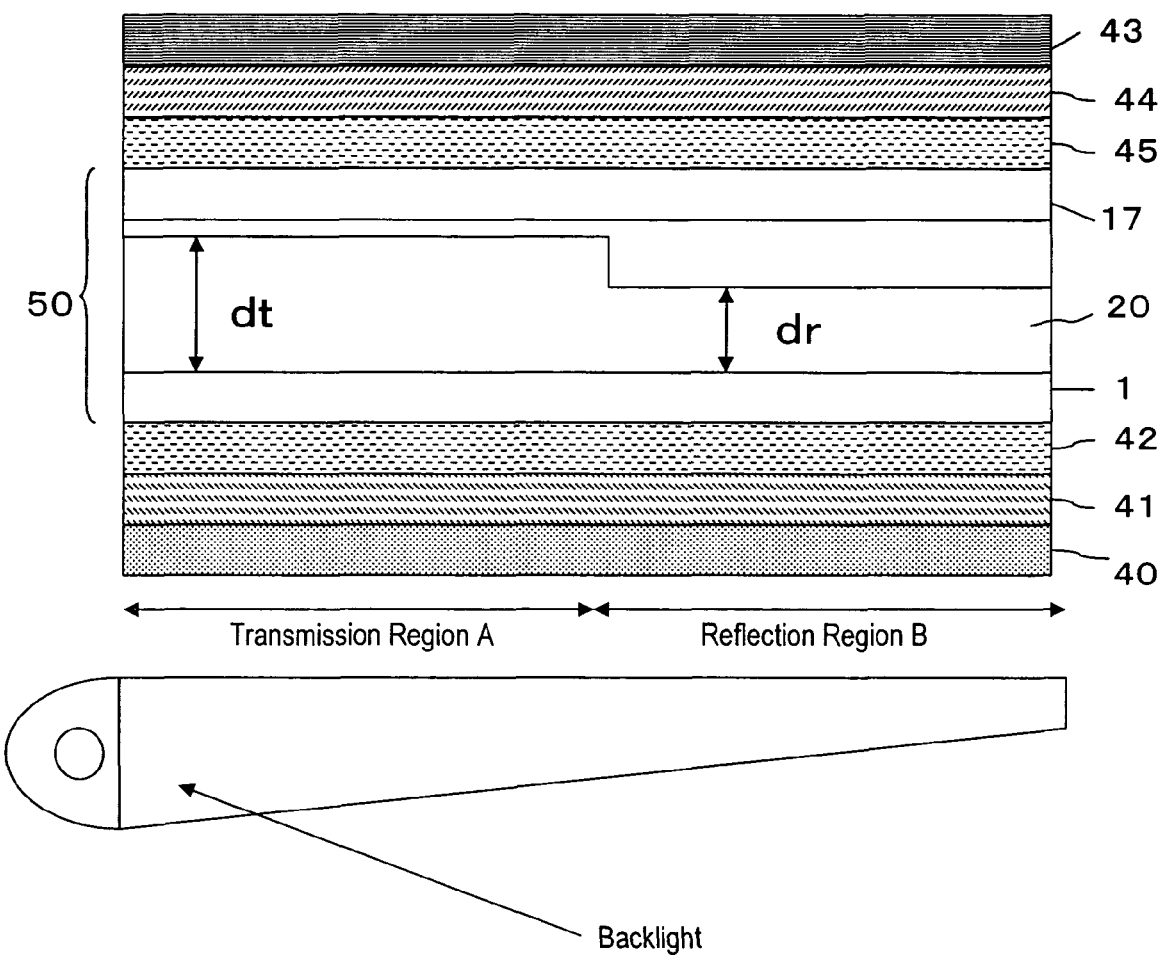
FIG. 7 is a diagrammatic view showing an example of construction of an LCD device of an embodiment of the present invention.

The LCD device shown in FIG. 7 includes: a backlight; a transflective liquid crystal panel 50; a pair of polarizing plates 40 and 43 placed to face each other via the transflective liquid crystal panel 50; a quarter wave plates 41 and 44 respectively placed between the polarizing plates 40 and 43 and the liquid crystal panel 50; and phase plates 42 and 45 having negative optical anisotropy respectively placed between the wave plates 41 and 44 and the liquid crystal panel 50. The liquid crystal panel 50 includes a vertically aligned liquid crystal layer 20 between a transparent substrate (active matrix substrate) 1 and a transparent substrate (counter substrate) 17. As the liquid crystal panel 50, one having the same construction as that of the LCD device 200 shown in FIGS. 2A and 2B is used.

The display operation of the LCD device shown in FIG. 7 will be briefly described.

In reflection-mode display, light incident from above passes through the polarizing plate 43 to be output as linearly polarized light. The linearly polarized light is changed to circularly polarized light with the quarter wave plate 44 placed so that the slower axis thereof forms 45° with the transmission axis of the polarizing plate 43. The circularly polarized light passes through the color filter layer (not shown) formed on the substrate 17. In the illustrated example, the phase plate 45 provides no phase difference for light incident in the normal direction.

During non-voltage application, in which liquid crystal molecules in the liquid crystal layer 20 are aligned roughly vertical to the substrate plane, incident light passes through the liquid crystal layer 20 with a phase difference of roughly 0 and is reflected with the reflective electrode formed on the lower substrate 1. The reflected circularly polarized light passes again through the liquid crystal layer 20 and the color filter layer. The light then passes through the phase plate 45 having negative optical anisotropy as the circularly polarized light, to enter the quarter wave plate 44, where the light is changed to linearly polarized light having a polarizing direction orthogonal to the polarizing direction given to the incident light after first passing through the polarizing plate 43, and reaches the polarizing plate 43. The resultant linearly polarized light fails to pass through the polarizing plate 43, and thus black display is provided.

During voltage application, in which the liquid crystal molecules in the liquid crystal layer 20 are tilted toward the horizontal direction from the direction vertical to the substrate plane, the incident circularly polarized light is changed to elliptically polarized light due to birefringence of the liquid crystal layer 20, and reflected with the reflective electrode formed on the lower substrate 1. The polarized state of the reflected light is further changed during passing back through the liquid crystal layer 20. The reflected light passes again through the color filter layer and then the phase plate 45 having negative optical anisotropy, to enter the quarter wave plate 44 as the elliptically polarized light. Accordingly, when reaching the polarizing plate 43, the light is not linearly polarized light having a polarizing direction orthogonal to the polarizing direction given to the original incident light, and thus passes through the polarizing plate 43. That is to say, by adjusting the applied voltage, the degree of the tilt of the liquid crystal molecules can be controlled, and thus the amount of reflected light allowed to pass through the polarizing plate 43 can be changed, to thereby enable grayscale display.

In transmission-mode display, the upper and lower polarizing plates 43 and 40 are placed so that the transmission axes thereof are orthogonal to each other. Light emitted from a light source is changed to linearly polarized light at the polarizing plate 40, and then changed to circularly polarized light when being incident on the quarter wave plate 41 placed so that the slower axis thereof forms 45° with the transmission axis of the polarizing plate 40. The circularly polarized light then passes through the phase plate 42 having negative optical anisotropy and is incident on the transmission region A of the lower substrate 1. In the illustrated example, the phase plate 42 provides no phase difference for light incident in the normal direction.

During non-voltage application, in which liquid crystal molecules in the liquid crystal layer 20 are aligned roughly vertical to the substrate plane, the incident light passes through the liquid crystal layer 20 with a phase difference of roughly 0. That is, the light incident on the lower substrate 1 as circularly polarized light passes through the liquid crystal layer 20 and then the upper substrate 17 in this state. The light then passes through the upper phase plate 45 having negative optical anisotropy, to enter the quarter wave plate 44. The lower and upper quarter wave plates 41 and 44 are placed so that the slower axes thereof are orthogonal to each other. Therefore, linearly polarized light orthogonal to the linearly polarized light at the polarizing plate 40 comes from the upper quarter wave plate 44. The linearly polarized light is then absorbed with the polarizing plate 43, and thus black display is provided.

During voltage application, in which the liquid crystal molecules in the liquid crystal layer 20 are tilted toward the horizontal direction from the direction vertical to the substrate plane, the incident circularly polarized light is changed to elliptically polarized light due to birefringence of the liquid crystal layer 20. The light then passes through the color filter layer 17, the phase plate 45 having negative optical anisotropy, and the quarter wave plate 44 as the elliptically polarized light. Accordingly, when reaching the polarizing plate 43, the light is not linearly polarized light orthogonal to the polarized component in the original incident light, and thus passes through the polarizing plate 43. That is to say, by adjusting the applied voltage, the degree of the tilt of the liquid crystal molecules can be controlled, and thus the amount of light allowed to pass through the polarizing plate 43 can be changed, to thereby enable grayscale display.

The phase plate having negative optical anisotropy minimizes the amount of change in phase difference occurring with change of the viewing angle when the liquid crystal molecules are in the vertically aligned state, and thus suppresses black floating observed when the display device is viewed at a wide viewing angle. A biaxial phase plate unifying the functions of the phase plate having negative optical anisotropy and the quarter wave plate may be used.

When axisymmetrically aligned domains are used to implement the normally black mode that presents black display during non-voltage application and white display during voltage application, as the embodiment of the present invention, a polarizing plate-caused extinction pattern can be eliminated by placing a pair of quarter wave plates on the top and bottom of the LCD device (panel), and thus the brightness can be improved. Also, when axisymmetrically aligned domains are used to implement the normally black mode with upper and lower polarizing plates placed so that the transmission axes thereof are orthogonal to each other, it is theoretically possible to present black display of substantially the same level as that obtained when a pair of polarizing plates are placed under crossed nicols. Therefore, a considerably high contrast ratio can be obtained, and also, with the all-direction alignment of liquid crystal molecules, wide viewing angle characteristics can be attained.

Figure 8:
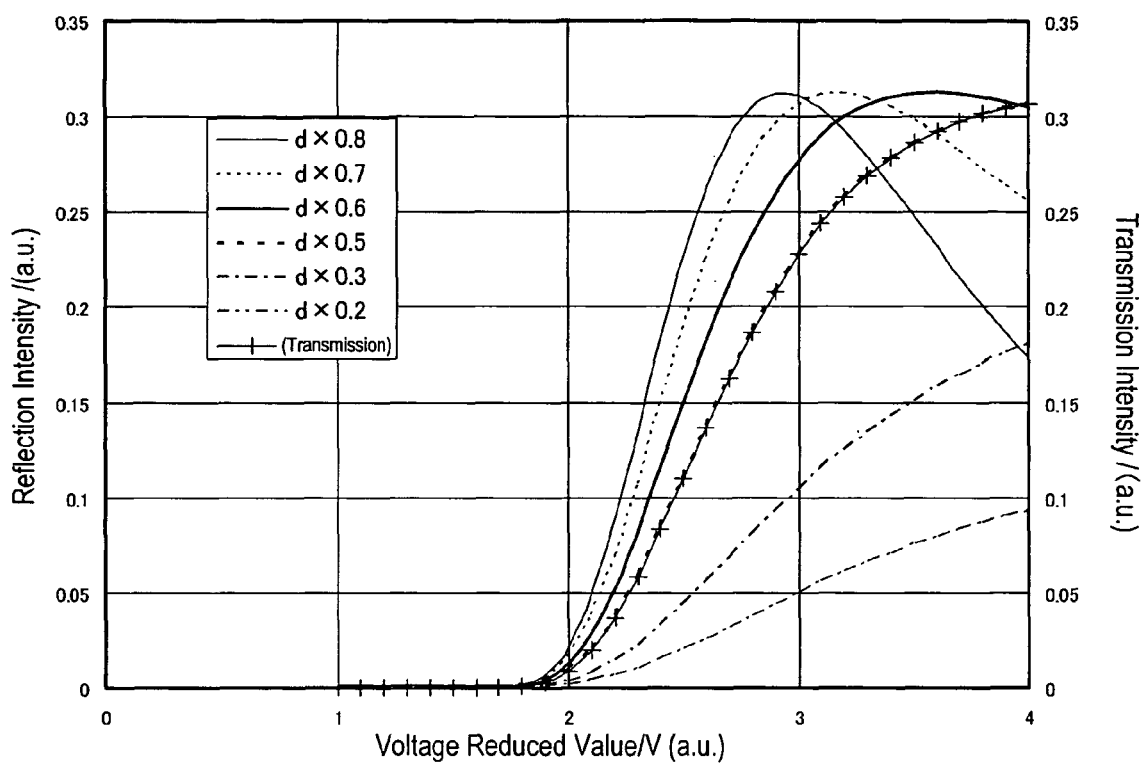
FIG. 8 is a graph showing the dependence of the voltage-reflectance (transmittance) of a transmission region and a reflection region on the thickness of the liquid crystal layer in an LCD device of an embodiment of the present invention.

The thicknesses dt and dr of the liquid crystal layer in the transmission region and the reflection region defined according to the present invention preferably has the relationship satisfying 0.3 dt<dr<0.7 dt, more preferably 0.4 dt<dr<0.6 dt, as is found from the dependence of the voltage-reflectance (transmittance) of the transmission region and the reflection region on the thickness of the liquid crystal layer shown in FIG. 8. If the thickness of the liquid crystal layer in the reflection region is smaller than the lower limit, the reflectance will be 50% or less of the maximum reflectance, failing to provide sufficiently high reflectance. If the thickness dr of the liquid crystal layer in the reflection region is greater than the upper limit, the peak of the reflectance in the voltage-reflectance characteristics exists at a drive voltage different from that in the case of the transmission display. Also, the relative reflectance tends to be low at a white display voltage optimal for the transmission display. The reflectance is as low as 50% or less of the maximum reflectance, failing to provide sufficiently high reflectance. Since the optical length in the liquid crystal layer in the reflection region is double that in the transmission region, the birefringence anisotropy ($\Delta n$) of the liquid crystal material and the panel cell thickness design are very important when the same design is made for both the transmission region and the reflection region.

Specific characteristics of the transflective LCD device of the embodiment of the present invention will be described as follows.

An LCD device having the construction shown in FIG. 7 was fabricated. As the liquid crystal cell 50, one having the same construction as that of the LCD device 200 shown in FIGS. 2A and 2B was used. Holes (through holes) 230b having a diameter of 8 μm were formed in the color filter layer (thickness (color layer portion): 1.8 μm) of the counter color filter substrate. A transparent dielectric layer having no light scattering function was formed on the color filter substrate as the transparent dielectric layer 234, and a resin layer having a continuous uneven surface was formed under the reflective electrode 211b, to adjust the diffuse reflection characteristics in the reflection display. In the pixel electrode 211 of the TFT substrate, openings 214a having a diameter of 8 μm were formed at predetermined positions in the transmission region and the reflection region.

The vertical alignment films were formed by a known method using a known alignment film material. No rubbing was made. A liquid crystal material having negative dielectric anisotropy ($\Delta n$:0.1 and $\Delta \epsilon$:−4.5) was used. In this example, the thicknesses dt and dr of the liquid crystal layer in the transmission region and the reflection region were set at 4 μm and 2.2 μm, respectively (dr=0.55 dt).

The LCD device of this example had a multilayer structure composed of a polarizing plate (observer side), a quarter wave plate (phase plate 1), a phase plate having negative optical anisotropy (phase plate 2 (NR plate)), the liquid crystal layer (on the upper and lower sides thereof, the color filter substrate and the active matrix substrate were respectively placed), a phase plate having negative optical anisotropy (phase plate 3 (NR plate)), a quarter wave plate (phase plate 4), and a polarizing plate (backlight side) in the order from the observer side. The upper and lower quarter wave plates (phase plates 1 and 4) were placed so that the slower axes thereof were orthogonal to each other, and had a phase difference of 140 nm. The phase plates having negative optical anisotropy (phase plates 2 and 3) had a phase difference of 135 nm. The two polarizing plates were placed so that the absorption axes thereof were orthogonal to each other.

A drive signal was applied to the thus-obtained LCD device (4V was applied across the liquid crystal layer) to evaluate the display characteristics.

Figure 9:
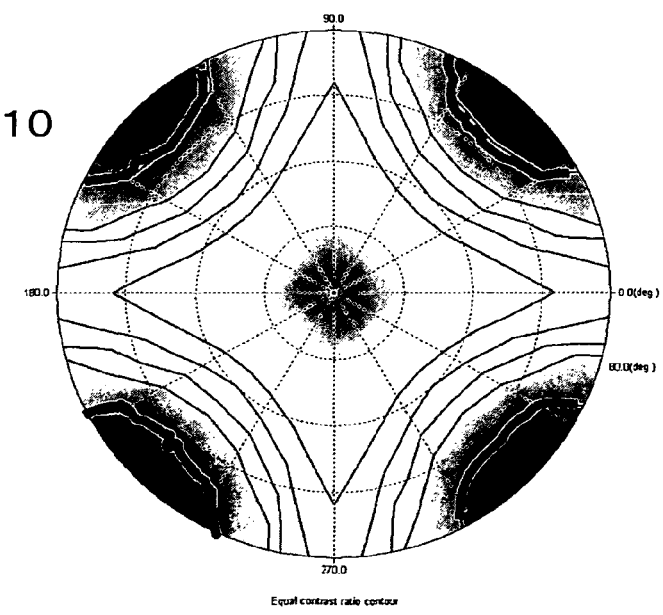
FIG. 9 is a view showing the visual angle—contrast ratio characteristics of an LCD device of an embodiment of the present invention.

The results of the visual angle—contrast characteristics are shown in FIG. 9. The viewing angle characteristics in the transparent display were roughly symmetric in all directions, the range CR>10 was as large as up to ±80°, and the transmission contrast was as high as 300:1 or more at the front.

As for the characteristics of the reflection display, the reflectance evaluated with a spectral colorimeter (CM2002 from Minolta Co., Ltd.) was about 8.6% (value in terms of the aperture ratio of 100%) with respect to a standard diffuse plate as the reference. The contrast value of the reflection display was 21, which was high compared with the case of the conventional LCD devices.

No roughness of display was observed in visual evaluation in a slanting direction in a grayscale level (level 2 in the eight levels of grayscale). On the contrary, for an LCD device fabricated under the same conditions except that no opening was formed in the pixel electrode or the counter electrode for comparison, roughness of display in a slanting direction was eminent in a grayscale level. In observation with an optical microscope with polarizing axes set orthogonal to each other, axisymmetrically aligned domains with their center axes aligned uniformly were recognized for the LCD device having electrode openings. For the latter LCD device having no opening, however, the center axes of some liquid crystal domains deviated from the centers of the sub-pixels, and it was confirmed that this variation in center axis position was a main cause of the roughness of display.

Samples of LCD devices, which are the same in construction as the LCD device shown in FIGS. 2A and 2B except that the openings 214a are not formed in the pixel electrode 211, and have holes different in depth in the color filter layer 230, were fabricated for evaluation of the grayscale response time and the effect of alignment recovery after pressing of the panel face. The thickness of the color filter layer was 1.8 μm as described above. In three samples of LCD devices, the depth of the holes was 1.8 μm (color layer through hole; Sample A), 0.8 μm (about 44% of the thickness of the color layer; Sample B), and 0.35 μm (about 19% of the thickness of the color layer; Sample C). In one sample (Sample D), no hole was formed in the color filter layer. The diameter of the holes was 8 μm in all samples.

The grayscale response time was evaluated by measuring the time (msec) required for a change from level 3 to level 5 in the eight levels of grayscale at room temperature (25° C.). The alignment recovery after panel pressing was evaluated by measuring the time taken until alignment disturbance (an afterimage) was no more observed (alignment recovers) after the panel face was pressed with a fingertip during application of 4V (white display).

TABLE 1

| Sample | Depth of "hole" (μm) | Grayscale response time (msec) | Recovery force after pressing |
|---|---|---|---|
| A | 1.8 | 40 | ⊚ (recovered within 5 sec) |
| B | 0.8 | 45 | ○ (recovered within 10 sec) |
| C | 0.35 | 54 | X (afterimage for 1 minute) |
| D | 0 | 60 | X (afterimage for several minutes) |

As is found from Table 1, by forming holes in the color filter layer, the grayscale response time is shortened and the recovery force from pressing improves. To ensure sufficient recovery force enabling recovery in less than one minute after pressing, the depth of the holes is preferably about 20% or more of the thickness of the color filter layer (for example, 0.36 μm or more), more preferably about 44% or more (for example, 0.8 μm or more).

An LCD device having the color filter substrate used for Sample A and having openings in the pixel electrode was also evaluated. As a result, the grayscale response time (time required for a change from level 3 to level 5 in the eight levels of grayscale; msec) was 37 msec. This indicates that the response speed is further improved by providing openings in the pixel electrode.

The reduction of the front transmittance in the transmission mode of the sample having openings in the pixel electrode, with respect to that of any of the samples having no opening at all, was about 0.8%. The reduction in brightness was therefore a level too low to cause a problem. That is to say, by forming holes in the color filter layer and forming openings in the pixel electrode, obtained is the effect of fixing/stabilizing the positions of the center axes of axisymmetrically aligned domains, and this provides the effects such as reduction in the roughness of display in a slanting visual angle in a grayscale level, improvement in the response speed in grayscale display, and reduction in occurrence of an afterimage after pressing.

As described above, according to the present invention, an LCD device excellent in display quality can be implemented with a comparatively simple construction. The present invention is suitably applied to transmissive LCD devices and transflective (transmissive/reflective) LCD devices. In particular, transflective LCD devices are suitably used as display devices for mobile equipment such as mobile phones.

While the present invention has been described in preferred embodiments, it will be apparent to those skilled in the art that the disclosed invention may be modified in numerous ways and may assume many embodiments other than that specifically set out and described above. Accordingly., it is intended by the appended claims to cover all modifications of the invention that fall within the true spirit and scope of the invention.

This non-provisional application claims priority under 35 USC §119(a) on Patent Application No. 2004-179889 filed in Japan on Jun. 17, 2004, the entire contents of which are hereby incorporated by reference.

What is claimed is:

1. A liquid crystal display device comprising
a first substrate, a second substrate opposed to the first substrate, and a vertically aligned liquid crystal layer interposed between the first substrate and the second substrate,
wherein the liquid crystal display device has a plurality of pixels, each pixel including a first electrode formed on the first substrate, a second electrode formed on the second substrate, and the liquid crystal layer interposed between the first electrode and the second electrode,
wherein the first electrode has a plurality of cuts defined at edge portions thereof, and wherein the cuts are located asymmetrically relative to a center of the pixel,
the first substrate has a shading region in gaps between the plurality of pixels, and a wall structure is placed regularly on the surface of the first substrate facing the liquid crystal layer in the shading region,
the second substrate has a color filter layer on the surface of the second electrode farther from the liquid crystal layer, the color filter layer having at least two holes arranged in a row in a predetermined direction in each pixel,
at least two liquid crystal domains having axisymmetric alignment are formed in the liquid crystal layer in each pixel when at least a predetermined voltage is applied across the liquid crystal layer, wherein the at least two liquid crystal domains are arranged in a row in the predetermined direction, and the center axis of the axisymmetric alignment of the at least two liquid crystal domains are formed in or near the at least two holes;
wherein the first electrode has at least two first openings formed at predetermined positions in the pixel, and one ends of the center axes of the axisymmetric alignment of the at least two liquid crystal domains are located in or near the at least two first openings, while the other ends are located in or near the at least two holes,
wherein the at least two first openings and the at least two holes in the color filter layer are located so as to at least overlap each other as viewed from above, and
wherein the second electrode has at least two second openings formed at positions corresponding to the at least two holes in the color filter layer.

2. The liquid crystal display device of claim 1, wherein the at least two holes each have a stepped or inclined side face.

3. The liquid crystal display device of claim 1, wherein the first electrode has at least one cut.

4. The liquid crystal display device of claim 1, wherein a support for defining the thickness of the liquid crystal layer is placed in the shading region located in gaps between the plurality of pixels.

5. The liquid crystal display device of claim 1, wherein the first electrode includes a transparent electrode defining a transmission region and a reflective electrode defining a reflection region, and the thickness dt of the liquid crystal layer in the transmission region and the thickness dr of the liquid crystal layer in the reflection region satisfy the relationship 0.3 dt<dr<0.7 dt.

6. The liquid crystal display device of claim 1, wherein the first electrode includes a transparent electrode defining a transmission region and a reflective electrode defining a reflection region, the at least two liquid crystal domains include liquid crystal domains formed in the transmission region, the at least two holes include holes corresponding to the center axis of the liquid crystal domains formed in the transmission region, and the first electrode has a plurality of cuts formed point-symmetrically with respect to the holes.

7. The liquid crystal display device of claim 5, wherein a transparent dielectric layer is selectively formed on the second substrate in the reflection region.

8. The liquid crystal display device of claim 7, wherein the transparent dielectric layer has a function of scattering light.

9. The liquid crystal display device of claim 5, wherein the optical density of the color filter layer in the reflection region is lower than that in the transmission region.

10. The liquid crystal display device of claim 1, further comprising: a pair of polarizing plates placed to face each other via the first substrate and the second substrate; and at least one biaxial optical anisotropic medium layer placed between the first substrate and one of the pair of polarizing plates and/or between the second substrate and the other polarizing plate.

11. The liquid crystal display device of claim 1, further comprising: a pair of polarizing plates placed to face each other via the first substrate and the second substrate; and at least one uniaxial optical anisotropic medium layer placed between the first substrate and one of the pair of polarizing plates and/or between the second substrate and the other polarizing plate.

12. A fabrication method for a liquid crystal display device of claim 1, comprising the step of forming the color filter layer, wherein the step of forming the color filter layer comprises the steps of:

forming a negative photosensitive resin film on the second substrate; exposing the negative photosensitive resin film to light so that at least one region smaller in exposure amount than the other region is formed at a predetermined position of the negative photosensitive resin film in each pixel; and developing the exposed photosensitive resin film to form the holes.

13. The method of claim 12, wherein the step of exposing the negative photosensitive resin comprises the step of forming a region in which the exposure amount changes stepwise or changes continuously, and the holes each having a stepped or inclined side face formed by developing the negative photosensitive resin layer.

14. The device of claim 1, wherein, in the pixel, more of the cuts are located on one side of a center of the pixel than on the other side of the center of the pixel.

* * * * *